US012585611B1

(12) United States Patent
Rodriguez et al.

(10) Patent No.: US 12,585,611 B1
(45) Date of Patent: Mar. 24, 2026

(54) PERIPHERAL COMPONENT INTERCONNECT EXPRESS SLOT V-GUIDE MODIFICATION

(71) Applicant: INTERNATIONAL BUSINESS MACHINES CORPORATION, Armonk, NY (US)

(72) Inventors: Osvaldo Rodriguez, Bronx, NY (US); Scott Bellamey, Rochester, MN (US); John David Spangenberg, Round Rock, TX (US); William Rod Groce, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/883,546

(22) Filed: Sep. 12, 2024

(51) Int. Cl.
*G06F 13/24* (2006.01)
*G06F 13/42* (2006.01)

(52) U.S. Cl.
CPC .. *G06F 13/4221* (2013.01); *G06F 2213/0026* (2013.01)

(58) Field of Classification Search
CPC ..................... G06F 13/4221; G06F 2213/0026
See application file for complete search history.

(56) References Cited

U.S. PATENT DOCUMENTS

| | | |
|---|---|---|
| 4,373,764 A | 2/1983 | Ulrich |
| 6,045,386 A | 4/2000 | Boe |
| 6,165,025 A | 12/2000 | Meng |

| | | | |
|---|---|---|---|
| 11,102,902 B2 | 8/2021 | Nelson et al. | |
| 11,868,301 B1 * | 1/2024 | Frink .................. | G06F 13/4022 |
| 2014/0351483 A1 | 11/2014 | Zhou et al. | |
| 2015/0003004 A1 | 1/2015 | Wu | |
| 2016/0294087 A1 | 10/2016 | Norton et al. | |

(Continued)

FOREIGN PATENT DOCUMENTS

| | | |
|---|---|---|
| CN | 102541230 A | 7/2012 |
| CN | 111061352 A | 4/2020 |

(Continued)

OTHER PUBLICATIONS

Casey, Jerome. "Computer Hardware: Hardware Components and Internal PC Connections", Technological University Dublin, jerome. casey@tudubln.ie , 2015, pp. 19-23, https://arrow.tudublin.ie/cgi/viewcontent.cgi?article=1003&context=schmuldissoft.

(Continued)

*Primary Examiner* — Henry Tsai
*Assistant Examiner* — Kim T Huynh
(74) *Attorney, Agent, or Firm* — Robert D. Bean

(57) ABSTRACT

According to at least one embodiment of the present invention, a hardware interface is provided, the hardware interface comprising a receiver configured to receive an adapter, the receiver having an insertion slot formed therein such that an opening of the insertion slot is defined in an uppermost surface of the receiver, wherein the receiver comprises a peripheral component interconnect express (PCIe) interface; and a guide structure disposed upon the uppermost surface of the receiver and configured to guide the adapter into the opening, the guide structure comprising a pair of symmetrical peaks disposed on either side of the insertion slot, and where each of the symmetrical peaks comprise an angular interior surface sloping downwards to an insertion slot.

17 Claims, 5 Drawing Sheets

(56)                 References Cited

U.S. PATENT DOCUMENTS

2017/0269943  A1        9/2017  Kumar et al.
2019/0079890  A1 *     3/2019  Matula ................ G06F 13/4045
2019/0095774  A1 *     3/2019  Ping ........................ H05K 1/18

FOREIGN PATENT DOCUMENTS

WO          2023/109724  A1      6/2023
WO          2024/013710  A1      1/2024

OTHER PUBLICATIONS

Tyson Mark. "Motherboard Shipments Plummet by Ten Million Units in 2022: Report", Motherboards, Feb. 12, 2023, 11 pages.

* cited by examiner

100

102

104

103

101

106

110  101  110

114

102

112

114

103

108

PERIPHERAL COMPONENT INTERCONNECT EXPRESS SLOT V-GUIDE MODIFICATION

BACKGROUND

The present invention relates, generally, to the field of computing, and more particularly to hardware interfaces.

In computing, an interface is a shared boundary across which two or more separate components of a computer system exchange information. This exchange may take place between software agents, computer hardware, peripheral devices, human users, et cetera. Hardware interfaces exist in almost all components of a computing system, such as buses, storage devices, other I/O devices, processors, etc. A hardware interface often takes the form of a hardware connector, such as a plug, socket, et cetera, that physically contacts another hardware connector of another device, as well the mechanical, electrical, and logical signals at the hardware interface and the protocol for sequencing them. The field of hardware interfaces may be the technological field concerned with the development and implementation of such hardware connectors, signals, and sequences, as well as systems, software, components, standards, et cetera that enable the different physical components of a computing system to communicate and work together effectively. The field of hardware interfaces encompasses a wide range of technologies, protocols, and standards that facilitate interaction between various hardware components, devices, and systems. These technologies may include, for example, physical connectors and cables, communications protocols, driver software, and interface standards.

Hardware interfaces are typically designed to conform to an interface standard; an interface standard is a set of rules and specifications that describe functional characteristics and/or physical characteristics necessary to allow the exchange of information between two or more components of a computing system. Physical characteristics describe electrical, mechanical, or optical characteristics of interface hardware such as physical connectors and cables, and functional characteristics describe the functional steps that must be executed to enable and/or facilitate data exchange over the interface hardware between physically or wirelessly interfacing hardware components, which may be described and/or implemented via protocols, drivers, firmware, software programs, et cetera. Interface standards may be promulgated by public or private organizations within an industry, and may be widely adopted within an industry; for example, commonly used interface standards may include USB, HDMI, Ethernet, SATA I2C, SPI, Bluetooth, and PCIe. Interface standards are crucial for ensuring compatibility and interoperability between different hardware components in an industry, and play a significant role in enabling the functionality, reliability, efficiency, and performance required in modern computing systems.

SUMMARY

According to at least one embodiment of the present invention, a hardware interface is provided, the hardware interface comprising a receiver configured to receive an adapter, the receiver having an insertion slot formed therein such that an opening of the insertion slot is defined in an uppermost surface of the receiver, wherein the receiver comprises a peripheral component interconnect express (PCIe) interface; and a guide structure disposed upon the uppermost surface of the receiver and configured to guide the adapter into the opening, the guide structure comprising a pair of symmetrical peaks disposed on either side of the insertion slot, and where each of the symmetrical peaks comprise an angular interior surface sloping downwards to an insertion slot.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figures 1A, 1B:
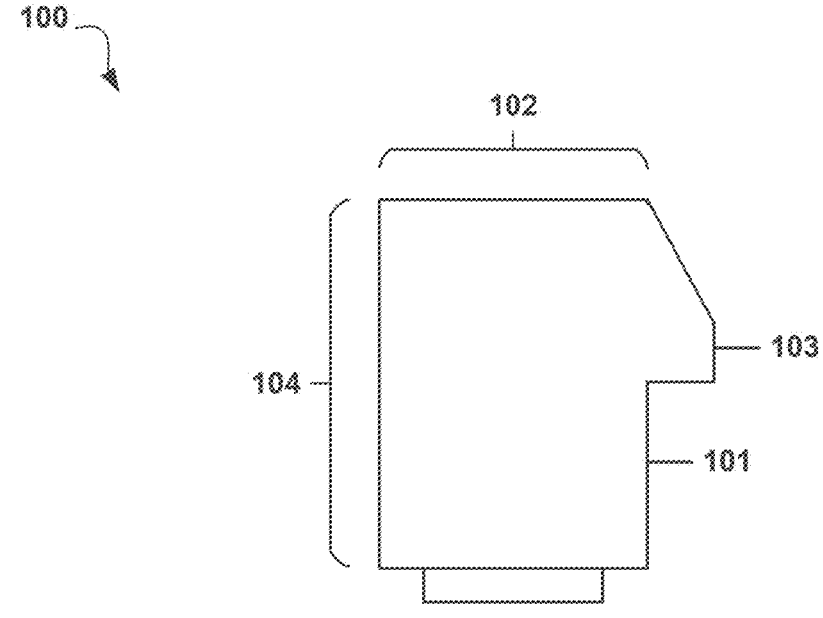
FIG. 1A is a cross-sectional view of a standard Peripheral Component Interconnect Express (PCIe) slot.
FIG. 1B is a top view of a standard PCIe slot.

Detailed embodiments of the claimed structures are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to hardware interfaces. The following described exemplary embodiments provide a structure to, among other things, provide an improved PCIe slot modified with raised angular guide structures to align and guide an adapter during insertion.

As previously described, the field of hardware interfaces may be the technological field concerned with the development and implementation of hardware connectors, signals, and sequences, as well as systems, software, components, standards, et cetera that enable the different physical components of a computing system to communicate and work together effectively.

One widely adopted standard in the computing industry is that of Peripheral Component Interconnect Express, officially abbreviated as "PCIe." PCIe is a high-speed serial computer expansion bus standard which governs motherboard interfaces for graphics cards, sound cards, hard disk drive host adapters, SSDs, Wi-Fi, and Ethernet hardware connections in personal computers. PCIe is based on point-to-point topology, with separate serial links connecting every device to the host. Under PCIe, hardware devices communicate via a logical connection called a link, which is a point-to-point communication channel between two devices connected via a PCIe-standard hardware interface. The PCIe interface may physically comprise two PCIe connectors: an adapter at one external device that is to be inserted into a PCIe device, and a receiver, or PCIe slot, at the other device, where the adapter fits into an opening of an insertion slot on the surface of the receiver to form a physical interface between the devices. Both the adapter and the receiver may conform to PCIe standards in terms of physical dimensions; for example, a standard PCIe slot may have a width of 7.5 mm, a height of 11 mm, and a length depending on the type of PCIe slot; for example, PCIe ×1, PCIe ×4, PCIe ×8, and PCIe ×16 interfaces have lengths of 25 mm, 39 mm, 56 mm, and 89 mm, respectively. PCIe adapters may be dimensioned to fit into and electrically interface with a given type of PCIe slot.

The PCIe interface represents a considerable improvement over its predecessor; the technology is versatile, fast, and effective. However, from an ergonomic standpoint, PCIe interfaces suffer from severe drawbacks. Often, PCIe slots are mounted so close together on a motherboard that all but the narrowest devices connected to the PCIe slot exceed the dimensions of the PCIe bay, blocking access to adjacent PCIe slots and effectively limiting the amount of devices that can be connected to the motherboard to a number less than the number of PCIe slots. In the context of enterprise servers, adapter widths may be 80% or more of the width of a PCIe bay. The long and narrow form factor of PCIe slots combined with the close proximity in which the slots are mounted serves to degrade the functionality of motherboards by physically blocking and rendering inaccessible otherwise perfectly functional PCIe slots. PCIe slots are often mounted so close together that there is no room to accommodate human fingers between them, with the result that adapters often cannot be guided into the PCIe slot and must instead be pushed from behind. Furthermore, PCIe components on either side and the device currently being inserted or removed from the PCIe slot often conspire to thoroughly occlude the PCIe slot from view. However, missing the PCIe slot while inserting an adapter can result in the adapter being wedged between the PCIe slot and the motherboard; wedged adapters may scratch, bend or break contact pins in the PCIe slot or adapter, and may break or damage surface mount components on the motherboard or the adapter such as capacitors or other raised structures. Damaging computer components often results in costly replacement costs and lengthy repair times. Even if damage doesn't ultimately result, multiple unsuccessful failed attempts to insert an adapter into a PCIe slot increase maintenance down time.

As such, it may be advantageous to, among other things, modify portions of the uppermost surface of the PCIe slot from a horizontal plane to an angular plane by increasing the height of the PCIe slot, thereby allowing misaligned adapters to realign when they make contact with the angular plane, and reducing the precision necessary to successfully connect an adapter to the PCIe slot. It may further be advantageous to provide an angular plane with a textured surface to provide tactile feedback to users even where the PCIe slot is occluded from view of a user, and/or to equip such a modified PCIe slot with a dust door, to prevent particulates from entering the PCIe slot and to provide additional guidance to users inserting an adapter into the PCIe insertion slot. It may further be advantageous to provide a modified PCIe slot with an enclosure on one or both ends, to provide further tactile guidance along the long axis of the PCIe slot by adding physical constraints. Such an invention stands to improve the field of hardware interfaces by improving the ease with which adapters can be connected to PCIe slots, and reducing instances of failed attempts to connect the adapter, which in turn reduces maintenance down time, reduces the likelihood of damage to electronic components, and reduces the need for a human user to see the PCIe slot on the motherboard when inserting an adapter, thereby decreasing the skills requirement for adding components and alleviating maintenance challenges posed by space and visibility restrictions within a server rack resulting from the long and narrow profile of PCIe slots and their dense positioning on a motherboard.

According to at least one embodiment, the invention may be a guide structure added to the upper surface of a standard PCIe slot; the guide structure may comprise a symmetrical pair of peaks, which are disposed on either side of an insertion slot running lengthways along the upper surface of the PCIe slot, and which are mirrored across the insertion slot. The peaks are vertical on their exterior face, rising 3 mm from the upper surface of the PCIe slot. At the top of the peaks, along the outer perimeter of the PCIe slot, the peaks are flattened to create a 0.4 mm wide horizontal surface, which may sufficiently dull the sharpness of the peaks so as to reduce the risk of injury. Beyond the upper surface of the PCIe slot is an angular surface, which slopes down 3.25 mm to the edge of the insertion slot. The length of the guide structure may be equivalent to the length of the PCIe slot.

According to at least one embodiment, the invention may be a V-shaped guide structure comprising two symmetrical peaks extending above the top of the peripheral component interconnect express (PCIe) slot on a server to guide an adapter into the slot. The guide structure increases the width of the area that the adapter can encounter the server and be guided successfully into the slot without damaging surface mount components or pins on the motherboard or adapter.

In one or more embodiments of the invention, the modified PCIe slot may be closed at both ends to provide additional tactile guidance in inserting an adapter into the PCIe slot by constraining movement along the long axis of the PCIe slot. In one or more embodiments of the invention, the modified PCIe slot may be closed on one end or the other end along the long axis to provide additional tactile guidance in inserting an adapter into the PCIe slot by constraining movement along the long axis of the PCIe slot while still accommodating adapters which may comprise locking/securing mechanisms such as latches with latches, or which otherwise exceed the length of the PCIe slot at one end. In embodiments, the modified PCIe slot may comprise a dust door with spring-loaded doors that serve to both protect the PCIe slot against dust and other particulates, and to exert pressure against the adapter being inserted and thereby provide tactile feedback to a user that helps to guide the adapter into the PCIe slot. In embodiments, the modified PCIe slot may comprise textured surfaces on the interior slope of the guide structure that provide additional guidance to the user even where the PCIe slot is occluded from view of the user by allowing the user to identify the peaks sloping into the insertion slot by touch alone, enabling the user to then correctly align and insert an adapter into the insertion slot based on the location of the interior surface of the peaks.

In embodiments, the guide structure may be constructed of any material strong enough to withstand the stresses associated with repeated contact with PCIe devices during the insertion process without breaking. For example, the guide structure may be constructed from durable thermoplastics such as polycarbonate or LCP (Liquid Crystal Polymer), and/or may be made of synthetic polymers such as nylon or PBT (Polybutylene Terephthalate). In embodiments, for example where the guide structure is manufactured as an integrated feature of the body of the PCIe slot, the guide structure may be made of the same materials as the body of the PCIe slot it is mounted to. In embodiments, for example where the guide structure is 3D-printed separately and retrofitted to the PCIe slot, the guide structure may comprise any material compatible with additive manufacturing techniques such as metals, synthetic polymers, thermoplastics, et cetera.

References in the specification to "one embodiment," "other embodiment," "another embodiment," "an embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the disclosed structures and methods, as oriented in the drawing figures. It will be understood that when an element as a layer, region or substrate is referred to as being "on" or "over" another element, it can be directly on the other element, or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The following described exemplary embodiments provide a system, method, and program product to provide an improved PCIe slot modified with raised angular guide structures to align and guide an adapter during insertion.

Referring now to FIG. 1A, a cross-sectional view 100 of a standard Peripheral Component Interconnect Express (PCIe) slot 101 is depicted. The standard PCIe slot 101 has a width 102 of 7.5 mm and a height 104 of 11 mm. Here, the standard PCIe slot 101 comprises a series of evenly spaced projections 103 which are disposed upon and extend from a right side of the standard PCIe slot 101. The projections 103 may be structural features of the standard PCIe slot 101 comprising evenly spaced structures projecting from one side of the PCIe slot 101. In embodiments, the PCIe slot 101 may possess projections 103 additionally or alternatively on the left side, or may not possess projections 103.

Referring now to FIG. 1B, a top view 106 of a standard PCIe slot 101 is depicted. The standard PCIe slot 101 is here depicted as a PCIe x1 interface, with a length 108 of 25 mm. The insertion slot 110 is disposed in the center of the upper surface of the PCIe slot 101 and has a width 112 of 5 mm, with horizontal surfaces 114 each extending 1.25 mm from the insertion slot 110 to the edges of the PCIe slot 101 on either side. The width 112 of the insertion slot also represents the "area of forgiveness" of the standard PCIe slot 101; the area of forgiveness may be the region where an adapter contacting the upper surface of the PCIe slot 101 will be smoothly guided into the insertion slot 110 and will safely and quickly interface with the PCIe slot 101.

Figure 2A:
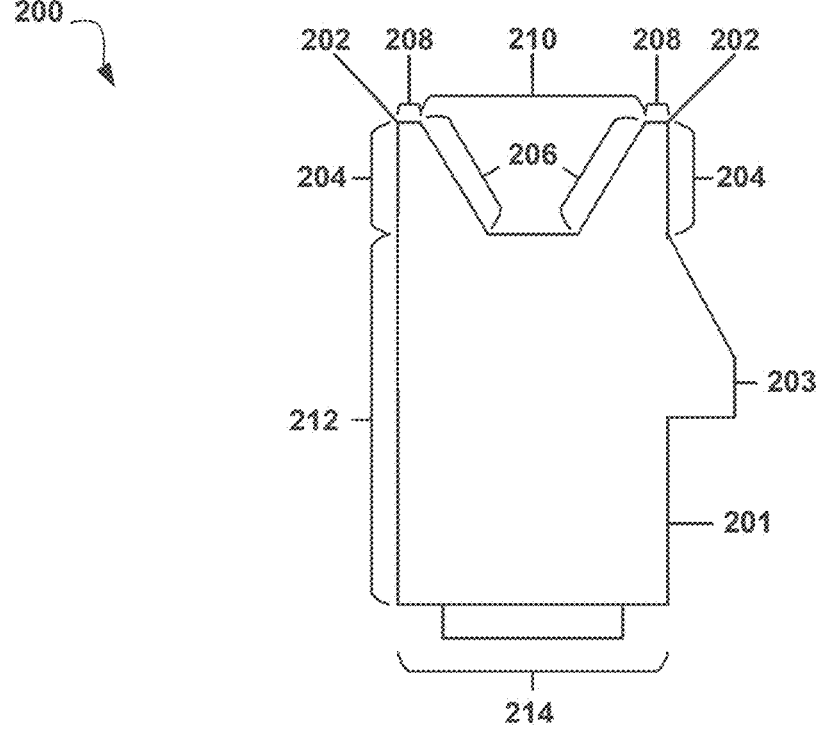
FIG. 2A is a cross-sectional view of a modified PCIe slot, according to at least one embodiment.

Referring now to FIG. 2A, a cross-sectional view 200 of a modified PCIe slot 201 is depicted, according to at least one embodiment. Here, the standard PCIe slot 101 has been modified with the addition of a guide structure comprising two symmetrical peaks 202, which are disposed on opposite sides of the upper surface of PCIe slot 101, on either side of the insertion slot (not shown). Each of the two peaks 202 comprise a vertical exterior face 204 with a height of 3 mm, which terminates in a flattened peak 208, which is 0.4 mm in width. One skilled in the art would understand that 3 mm is an exemplary embodiment, and that the peaks 202 could be higher or lower; however, the upper height of the peaks 202 is constrained due to clearance issues on the PCIe adapters; for example, if the peaks 202 exceed a threshold safe height, for example 12 mm, the peaks 202 may be high enough to contact external structures on an adapter that might be inserted, and may damage or knock off such structures. If the peaks 202 are too low, the angle of the interior face 206 of peaks 202 may fall below a threshold minimum height, for example 1 mm, and be incapable of meaningfully guiding an adapter into the insertion slot. The interior face 206 comprises an angular plane that slopes downwards to the outer edges of the insertion slot (not shown) and which is 3.25 mm in width. The modified PCIe slot 201 is otherwise identical to the standard PCIe slot 101, with a width 214 of 7.5 mm and a height (less the height of the peaks 202) of 11 mm and comprising a series of evenly spaced projections 203 which project from one side of the modified PCIe slot 203. The projections 203 may be structural features of the modified PCIe slot 201 comprising evenly spaced structures disposed upon and extending from a right side of the modified PCIe slot 201. The projections 203 may be equivalent in dimension to the projections 103 of the standard PCIe slot 101, or may differ. In embodiments, the modified PCIe slot 201 may alternatively or additionally possess projections 203 on a left side, or may not possess projections 203. Region 210 represents the "area of forgiveness" of the modified PCIe slot 201; here, the area of forgiveness is 6.7 mm wide, and encompasses the region between the flattened peaks 208, which comprises the angular planes 206 and the insertion slot (not shown); the reason for this is that an adapter contacting the insertion slot or the angular planes 206 will be smoothly guided into the insertion slot and will safely and quickly interface with the PCIe slot 201.

Figure 2B:
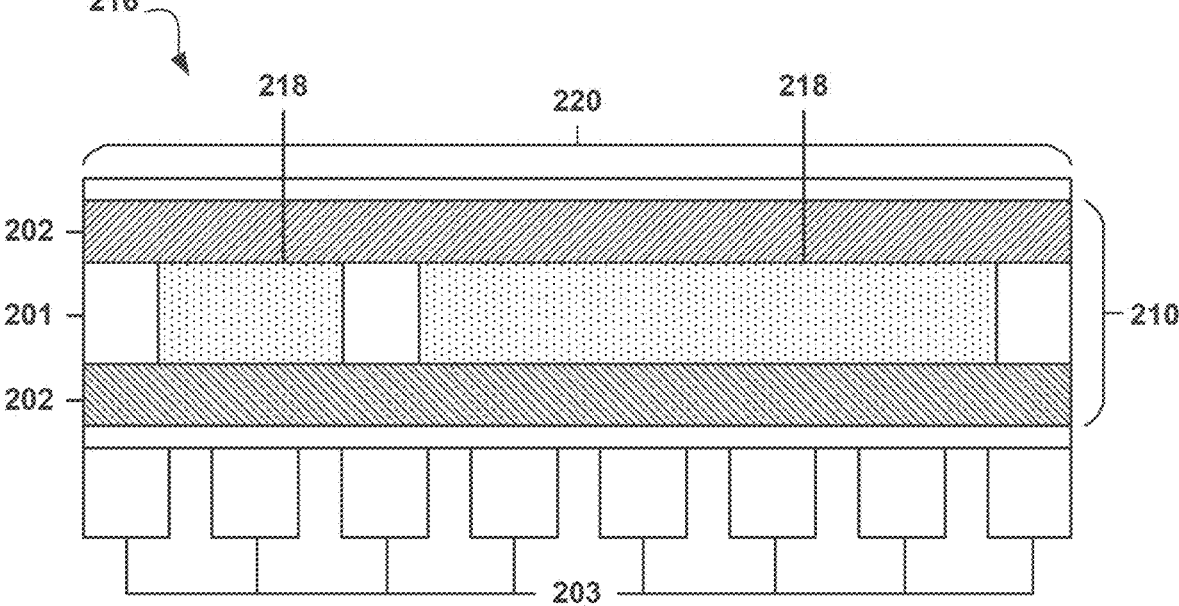
FIG. 2B is a top view of a modified PCIe slot, according to at least one embodiment.

Referring now to FIG. 2B, a top view 216 of a modified PCIe slot 201 is depicted, according to at least one embodiment. Here, a top-down view of the peaks 202, the area of forgiveness 210, and the insertion slot 220 are depicted. The modified PCIe slot 201 is here depicted as a PCIe x1 interface, with a length 220 of 25 mm. However, ones skilled in the art would understand embodiments of the invention to apply equally to PCIe slots of any length. For example, embodiments of the invention could apply to PCIe x4, PCIe x8, or PCIe x16 interfaces, which have lengths of 39 mm, 56 mm, and 89 mm, respectively, and are otherwise identical or substantially similar with respect to their dimensions. Additionally, ones skilled in the art would understand embodiments of the invention to apply equally to any hardware interfaces comprising receivers with long, narrow form factors, not merely those conforming to the PCIe standard. For example, features of the invention could apply equally to receivers conforming to interface standards including PCI, Industry Standard Architecture (ISA), VESA Local Bus, Micro-Channel Architecture (MCA), et cetera.

Figure 3A:
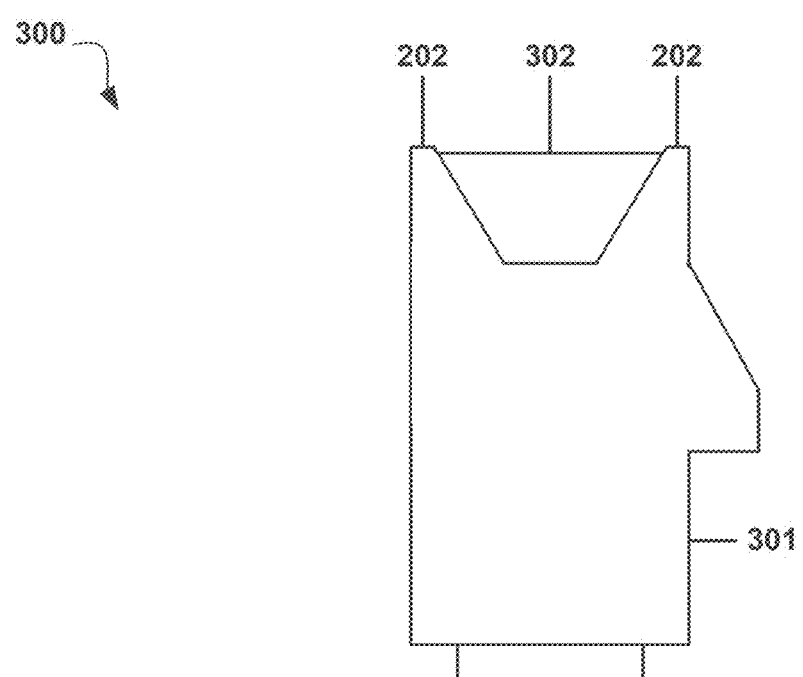
FIG. 3A is a cross-sectional view of a modified PCIe slot with one end closed, according to at least one embodiment.

Referring now to FIG. 3A, a cross-sectional view 300 of a modified PCIe slot 301 with one end closed is depicted, according to at least one embodiment. Here, a panel 302 has been attached to the ends of the peaks 202, such that the panel 302 is attached perpendicularly to an end of the guide structure and is attached at each end to a separate peak 202, enclosing an end of the guide structure and/or PCIe slot 301.

Figure 3B:
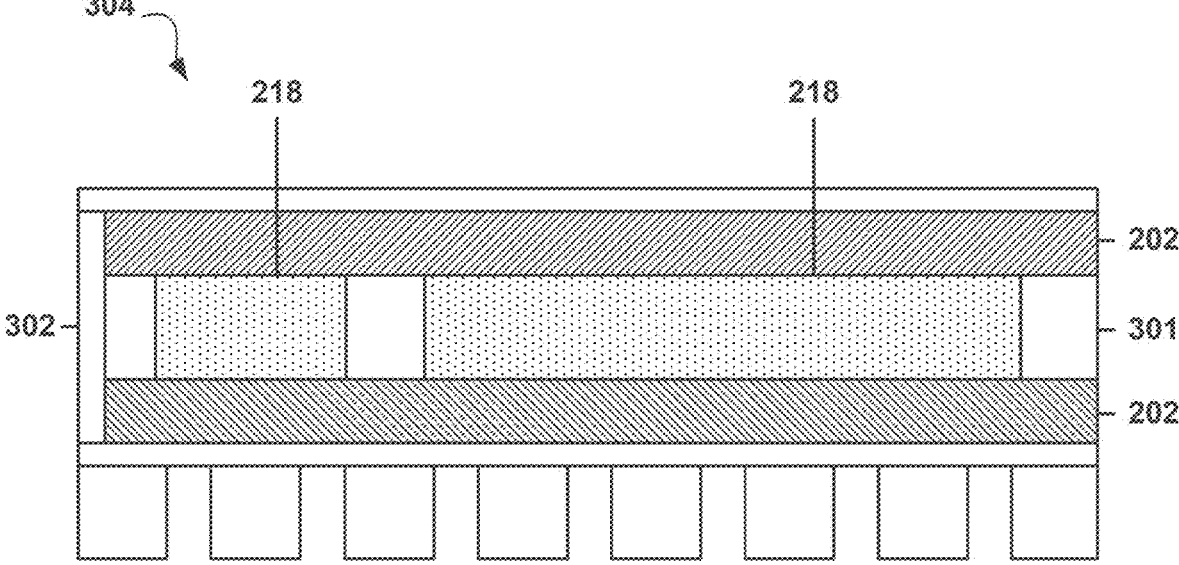
FIG. 3B is a top view of a modified PCIe slot with one end closed, according to at least one embodiment.

Referring now to FIG. 3B, a top view 304 of a modified PCIe slot 301 with one end closed is depicted, according to at least one embodiment. The panel 302 may serve to provide additional tactile guidance in inserting an adapter into the insertion slot 218 by constraining movement along the long axis of the modified PCIe slot 301 while still accommodating adapters which may comprise locking/securing mechanisms such as latches or hooks, which otherwise exceed the length of the PCIe slot 301 at one end.

Figure 4:
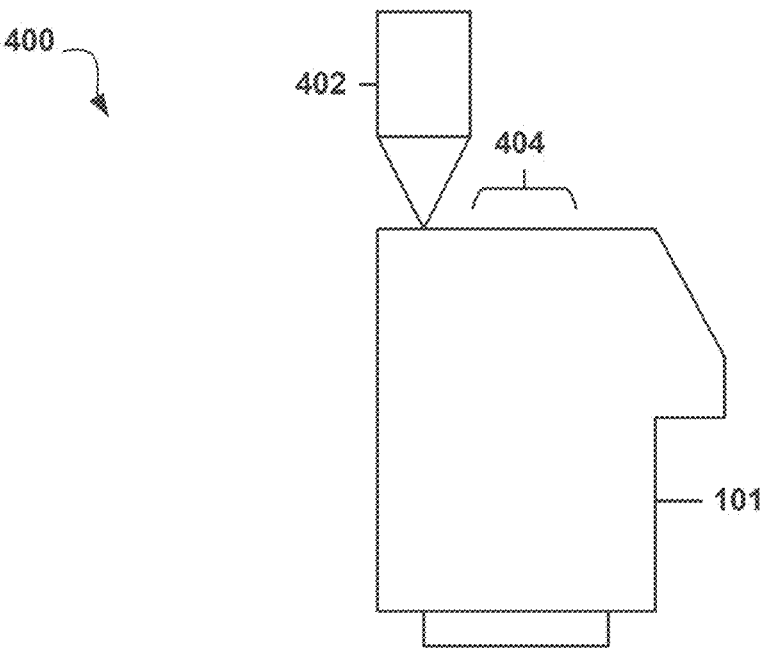
FIG. 4 is a cross-sectional view of a standard PCIe slot during insertion of an adapter.

Referring now to FIG. 4, a cross-sectional view 400 of a standard PCIe slot 101 during insertion of an adapter 402 is depicted. The adapter 402 may be a standard PCIe adapter 402, comprising a long flat electrically conductive blade with a narrow cross section. To successfully plug into the standard PCIe slot 101, the adapter 402 must be aligned with the insertion slot 110 along its entire length, or else the section of the adapter 402 that is not within the area of forgiveness 404 will contact the upper surface of the standard PCIe slot 101 and be unable to enter the insertion slot 110. Here, the adapter 402 is outside the area of forgiveness 404, and therefore the user inserting adapter 402 will need to make additional attempts to enter the insertion slot 110.

Figure 5:
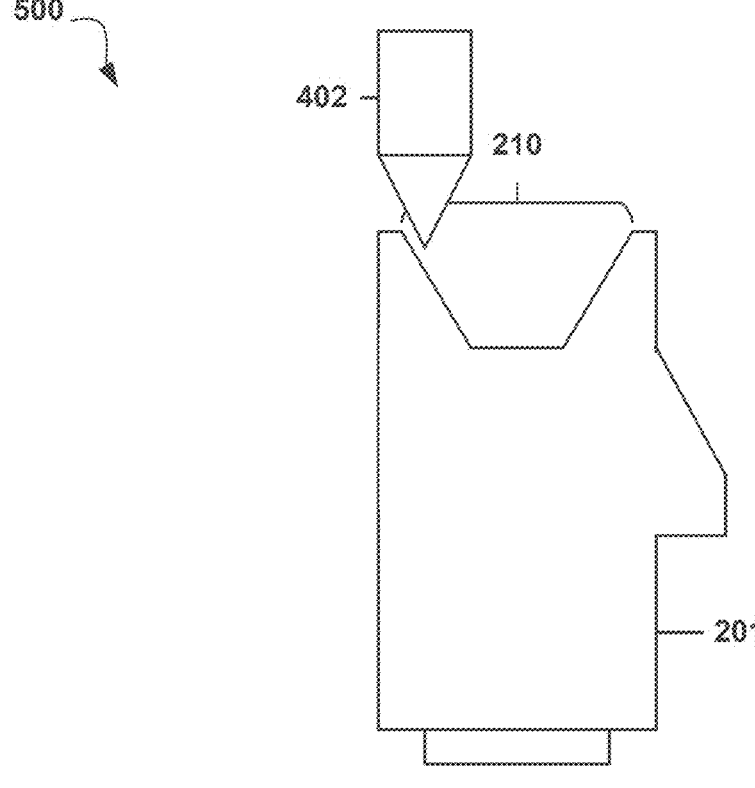
FIG. 5 is a cross-sectional view of a modified PCIe slot during insertion of an adapter, according to at least one embodiment.

Referring now to FIG. 5, a cross-sectional view 500 of a modified PCIe slot 201 during insertion of an adapter 402 is depicted, according to at least one embodiment. Here, if any part of adapter 402 contacts the angular surfaces 206, the angular surfaces 206 will redirect the forces exerted on pushing the adapter 402 downwards and towards the insertion slot 218, such that adapter 402 will be guided into the insertion slot 218 whether or not adapter 402 is aligned with the insertion slot or not. For this reason, the area of forgiveness 210 is 1.7 mm wider than the area of forgiveness 106. Accordingly, even though adapter 402 has contacted the same place on standard PCIe slot 101 and on modified PCIe slot 201, the adapter 402 on modified PCIe slot 201 has landed within the zone of forgiveness and will successfully interface with the modified PCIe slot 201, whereas the adapter 402 on standard PCIe slot 101 did not successfully interface with the standard PCIe slot.

Figure 6:
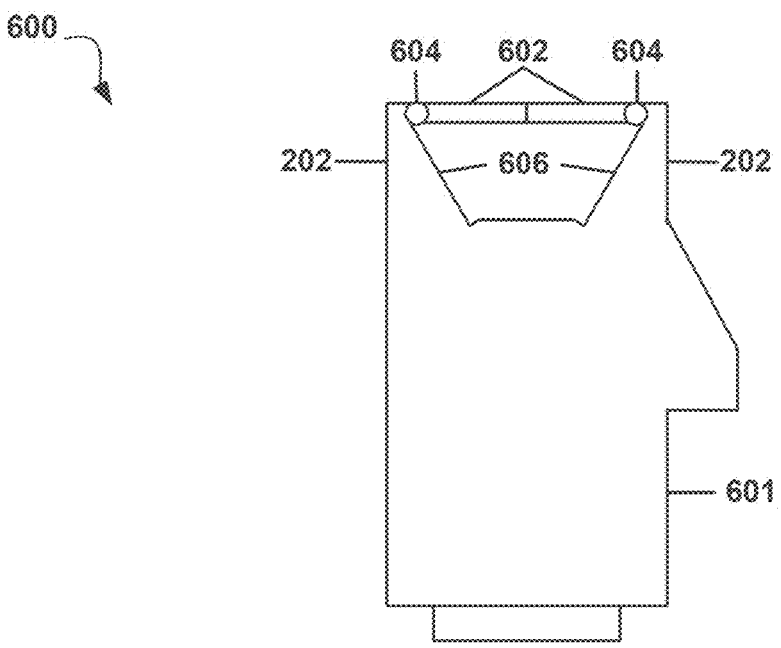
FIG. 6 is a cross-sectional view of a modified PCIe slot with a dust door, according to at least one embodiment.

Referring now to FIG. 6, a cross-sectional view 600 of a modified PCIe slot 601 with a dust door is depicted, according to at least one embodiment. Here, modified PCIe slot 601 comprises a trap door mechanism comprising two flaps 602 which are attached to hinges 604 mounted at the top of the interior surface of the two symmetrical peaks 202 and which run the entire length of the modified PCIe slot 601. The flaps 602 are movable axially on their hinges 604 to swing downward into recesses 606, which comprise voids removed from the material of the symmetrical peaks 202 to receive the flaps 602 when they are in an open state. The recesses 606 may be sized to fit the flaps 602 such that when in the open state, the flaps 602 are fully recessed into the PCIe slot 601 and do not occlude the insertion slot (not shown). The flaps 602 are spring-loaded such that when no external force is being applied to the flaps 602, the flaps 602 maintain a default closed state where the flaps 602 are disposed parallel or substantially parallel to each other, and where the interior ends of the flaps 602 are aligned with and, in embodiments, physically engaging with each other to fully cover the PCIe slot 601 and shield the insertion slot (not shown) from dust and other particulates. The flaps 602, when transitioning from a closed state to an open state in response to external force, may serve to guide an adapter into the insertion slot.

Figure 7:
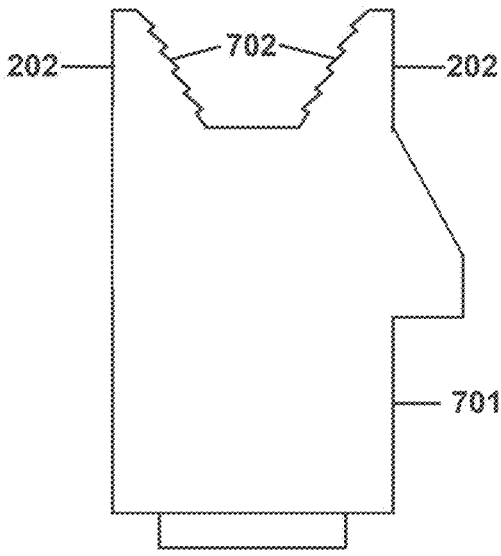
FIG. 7 is a cross-sectional view of a modified PCIe slot with a textured slope, according to at least one embodiment.

FIG. 7 is a cross-sectional view 700 of a modified PCIe slot 701 with a textured slope, according to at least one embodiment. Here, the modified PCIe slot 701 comprises a textured surface 702 along the interior slope of the symmetrical peaks 202, which may be a corrugated surface comprising parallel ridges and furrows that vary the slope of the interior surface of the symmetrical peaks 202 to create a distinct texture. The textured surface 702 provides tactile feedback to users when inserting an adapter into the PCIe slot 701, which provides sensory guidance to a human user even where the PCIe slot 701 is occluded from view of the user.

It may be appreciated that FIGS. 2-3 and 5-7 provide only illustrations of individual implementations and do not imply any limitations with regard to how different embodiments may be implemented. Many modifications to the depicted environments may be made based on design and implementation requirements. For example, in one or more embodiments of the invention, the modified PCIe slot may be closed on one end or the other end to accommodate adapters with latches or overhanging structure on the non-closed side, or may be closed at both ends. One skilled in the art would appreciate that features of the various embodiments may be combined in any combination; for example, the modified PCIe slot may comprise a dust door, one or two end panels, and/or textured interior surfaces.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A hardware interface comprising:
a receiver configured to receive an adapter, the receiver having an insertion slot formed therein such that an opening of the insertion slot is defined in an uppermost surface of the receiver, wherein the receiver comprises a peripheral component interconnect express (PCIe) interface; and
a guide structure disposed upon the uppermost surface of the receiver and configured to guide the adapter into the opening, the guide structure comprising a pair of symmetrical peaks, wherein each of the symmetrical peaks comprises an angular interior surface sloping downwards to the insertion slot.

2. The hardware interface of claim 1, wherein the symmetrical peaks are disposed on either side of the insertion slot.

3. The hardware interface of claim 1, wherein the symmetrical peaks comprise an uppermost horizontal surface 0.4 millimeters in width.

4. The hardware interface of claim 1, wherein the angular interior surface is textured.

5. The hardware interface of claim 1, wherein the guide structure comprises a dust door forming an uppermost surface of the guide structure.

6. The hardware interface of claim 1, wherein the receiver comprises a PCIe ×1 interface, a PCIe ×4 interface, a PCIe ×8 interface, or a PCIe ×16 interface.

7. A hardware interface comprising:

a receiver configured to receive an adapter, the receiver having an insertion slot formed therein such that an opening of the insertion slot is defined in an uppermost surface of the receiver, wherein the receiver comprises a peripheral component interconnect express (PCIe) interface;

a guide structure disposed upon the uppermost surface of the receiver and configured to guide the adapter into the opening, the guide structure comprising a pair of symmetrical peaks, wherein each of the symmetrical peaks comprises an angular interior surface sloping downwards to the insertion slot; and a panel disposed perpendicularly against an end of the guide structure enclosing one end of the guide structure.

8. The hardware interface of claim 7, wherein the symmetrical peaks are disposed on either side of the insertion slot.

9. The hardware interface of claim 7, wherein the symmetrical peaks comprise an uppermost horizontal surface 0.4 millimeters in width.

10. The hardware interface of claim 7, wherein the angular interior surface is textured.

11. The hardware interface of claim 7, wherein the guide structure comprises a dust door forming an uppermost surface of the guide structure.

12. The hardware interface of claim 7, wherein the receiver comprises a PCIe ×1 interface, a PCIe ×4 interface, a PCIe ×8 interface, or a PCIe ×16 interface.

13. A hardware interface comprising:

a receiver configured to receive an adapter, the receiver having an insertion slot formed therein such that an opening of the insertion slot is defined in an uppermost surface of the receiver, wherein the receiver comprises a peripheral component interconnect express (PCIe) interface;

a guide structure disposed upon the uppermost surface of the receiver and configured to guide the adapter into the opening, the guide structure comprising a pair of symmetrical peaks, wherein each of the symmetrical peaks comprises an angular interior surface sloping downwards to the insertion slot; and two panels each disposed perpendicularly against both of two ends of the guide structure, enclosing both ends of the guide structure.

14. The hardware interface of claim 13, wherein the symmetrical peaks are disposed on either side of the insertion slot.

15. The hardware interface of claim 13, wherein the symmetrical peaks comprise an uppermost horizontal surface 0.4 millimeters in width.

16. The hardware interface of claim 13, wherein the angular interior surface is textured.

17. The hardware interface of claim 13, wherein the guide structure comprises a dust door forming an uppermost surface of the guide structure.

* * * * *